(12) United States Patent
Farnsworth (10) Patent No.: US 6,922,232 B2
(45) Date of Patent: Jul. 26, 2005

(54) TEST SYSTEM FOR LASER DIODE FAR-FIELD PATTERN MEASUREMENT

(75) Inventor: Stephen W. Farnsworth, Loveland, CO (US)

(73) Assignee: Infineon Technologies North America Corp., Cary, NC (US)

(*) Notice: Subject to any disclaimer, the term of this patent is extended or adjusted under 35 U.S.C. 154(b) by 487 days.

(21) Appl. No.: 10/254,344

(22) Filed: Sep. 24, 2002

(65) Prior Publication Data

US 2004/0066504 A1 Apr. 8, 2004

(51) Int. Cl.[7] .................................................. G01J 1/00
(52) U.S. Cl. ........................................................ 356/121
(58) Field of Search .................................. 356/121–122

(56) References Cited

FOREIGN PATENT DOCUMENTS

JP          63195538 A  *  8/1988   .......... G01M/11/00

* cited by examiner

Primary Examiner—Gregory J. Toatley, Jr.
Assistant Examiner—Amanda Merlino
(74) Attorney, Agent, or Firm—Bever, Hoffmann & Harms, LLP; Patrick T. Bever (57) ABSTRACT

A test system for positioning and measuring the far-field pattern of a laser diode under test (LDUT) using a single objective lens and two relay lenses. Positioning is achieved by passing light from the LDUT through a video microscope formed by the objective lens and a first relay lens, which focuses the light onto an image plane for capture by a first camera. Far-field pattern measurement is performed by reflecting a portion of the focused light through a second relay lens, which collimates the light and directs the unfocused light onto an infinity image plane, where it is captured by a second video camera. Angular orientation is achieved using a laser collimator that reflects beam energy from a datum plane of the LDUT. The reflected beam energy forms a point image at the infinity image plane that is used to determine and/or adjust the angular orientation of the LDUT.

20 Claims, 8 Drawing Sheets

FIG. 13

TEST SYSTEM FOR LASER DIODE FAR-FIELD PATTERN MEASUREMENT

FIELD OF THE INVENTION

The present invention is directed to optical systems for determining the performance of light-emitting devices, and more particularly to test equipment for measuring the performance characteristics of lasers.

BACKGROUND

Figure 1:
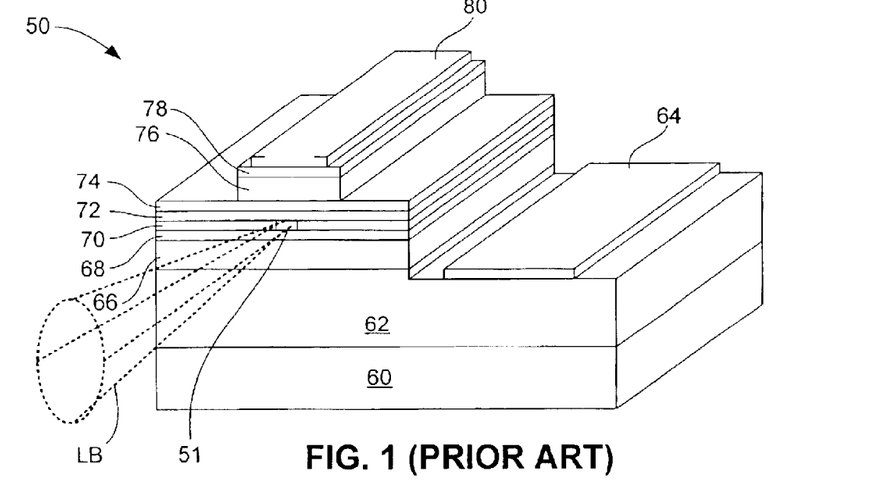
FIG. 1 is a perspective front view depicting a conventional InGaN laser diode.

FIG. 1 is a perspective view depicting a conventional Indium-Gallium-Nitride (InGaN) multi-quantum-well (MQW) structure laser diode 50, which is exemplary of one type of laser diode. Referring to the lower portion of FIG. 1, laser diode 50 includes an n-doped GaN layer 62 formed on a substrate (e.g., $SiO_2$) 60. An n-electrode 64 is formed on the right-side upper surface side of n-doped GaN layer 62. On the left side of n-doped GaN layer 62 is a stack respectively including an n-doped Aluminum-Gallium-Nitride (AlGaN) cladding layer 66, an n-doped GaN separated confinement hetero (SCH) layer 68, a quantum well region 70 comprising multiple InGaN/GaN layers, a p-doped AlGaN barrier layer 72, an 9-doped GaN SCH layer 74, a p-doped AlGaN cladding layer 76, a p-doped GaN layer 78, and a p-electrode 80. During operation, a suitable voltage potential is applied to n-electrode 64 and p-electrode 80, causing electrons and holes to combine in quantum well region 70 in a manner such that a highly coherent (in this case blue) laser beam LB is emitted from a point 51 located on a face 52 of laser diode 50. Additional details regarding the physics involved in generation of laser beam LB by laser diode 50 are beyond the scope of the present invention, and are therefore omitted for brevity.

Laser diodes, such as AlGaN laser diode 50, are used in many applications, such as in the DVD read head of an MP3 player and in fiber optic switches. Such laser diodes are typically mass-produced, and good manufacturers try to make the laser diodes as consistent as possible, but there are deviations in performance (e.g., in the direction, intensity and divergence of the emitted laser beam). In some applications these deviations may not be important. However, certain applications are very sensitive to the divergence and the pointing direction of the laser beam, and it is important to verify laser performance to assure proper operation of the host device. For example, in an MP3 disk player, a laser diode is mounted on a silicon chip that includes control circuitry for the DVD read head. During the mounting process, the laser diode must be mounted properly and the far-field pattern of the laser beam identified so that the optics of the system are aligned to the correct coordinates to be at the center of the beam pattern. Because no adjustments to laser diode are possible once glued in place, the characteristics of laser diode must be determined before this mounting process takes place, or if at the time of attachment, then before the glue is hardened.

A conventional system used to measure the far-field pattern of laser diodes for these sensitive applications uses a video system to transduce data from the laser's light emission far-field pattern to characterize the angular distribution of the laser energy. The desired information about a laser diode pattern are the parameters describing it as a two-dimensional Gaussian pattern, including pointing angles in the X-axis and Y-axis directions plus width angles, such as Full Width at Half Maximum (FWHM). The coordinate system of these parameters has as its origin the emission point of the laser (e.g., emission point 51; see FIG. 1), and physical datums defining the axes angularly are the planar surfaces of the laser device itself (i.e., face 52 of laser diode 50, the solid state chip on which the laser device is fabricated, or another structure into which the laser device is assembled, such as the typical "TO Can" package). Part of the necessary measurement process involves determining the position of the measurement instrument relative to these laser device axes. In other words, one must "pick up" the datum surface of the laser device, as well as the radiation pattern generated by the laser device in order to consistently repeat the testing process for each laser diode.

Several conventional instruments are commercially available for characterizing the angular distribution of laser energy generated by a laser device. One class of such conventional instruments performs this function using a charge-coupled device (CCD) video camera to sense the illumination pattern of laser beams, and to transduce the pattern to a digitized file for detailed analysis of the illumination pattern geometry. This technique has been used for some time to sense the illumination pattern of gas lasers, which generate light that is essentially collimated. Laser diodes, on the other hand, are essentially point sources, so the emitted light is highly divergent (i.e., the geometry of the light pattern scales linearly with distance from the source). Accordingly, laser diodes are characterized by the emitted light intensity versus angle. Therefore, for laser diode characterization, precise measurement of the source point location is necessary, as well as the orientation of the device in angles "pitch" and "roll" (angles $\theta_X$ and $\theta_Y$).

Laser diode characterization requires tooling that determines the exact position of the light-emitting device in 6 dimensions: X, Y, Z and $\theta_X$, $\theta_Y$, and $\theta_Z$ (although the precision requirement for $\theta_Z$ is low). The positioning of the laser diode may be performed by active alignment or passive alignment. Active alignment is performed using a system that provides a view of the laser and mechanical means to adjust the position of the laser diode to an exact reference position before testing. Passive alignment involves mounting hardware that mechanically constrains the laser diode position with variability that is small in comparison to the desired resolution of the laser far-field pattern measurement system. Typical passive systems use mechanical references only, as with a laser in a "can" (transistor housing) being clamped into a reference mount of precise fit, so the orientation of the housing is determined to some precision.

A typical practice in testing laser diodes is to attach the laser to a precision linear slide device, and affix three instruments parallel to each other and bearing on three "parking positions" for the laser diode under test. The three instruments are a microscope, an autocollimator, and a far-field camera. The laser diode to be tested is adjusted in X, Y and Z directions at the microscope, then translated a measured amount via the linear slide to the position of the autocollimator where its orientation is adjusted in angles $\theta_X$ and $\theta_Y$, then translated another measured amount slide to the third position of the far-field camera where the image of the radiation pattern is detected and measured. Other means are needed to align the three instruments, microscope, autocollimator and far-field camera, so they match precisely in "zero" pointing direction. Typical for this would be a small laser "light pen" device which can be attached to the same slide and aligned to one instrument or the other to the position $\theta_X=0$ and $\theta_Y=0$, then translated to the other instrument. The second instrument is mechanically realigned in pointing direction to give the same indication $\theta_X=0$ and $\theta_Y=0$ for that light pen output.

A disadvantage associated with conventional systems for testing laser diodes is that the precise determination of the location of the part under test is problematic. Mechanical, passive alignment systems are not precise enough for orienting the angle of laser diode chips, whose dimensions are typically 0.3 mm square. Optical detection for measuring the X, Y and Z position is typically performed by a microscope, and optical detection for measuring the angles $\theta_X$ and $\theta_Y$ is typically performed by an autocollimator, and both of these instruments compete for space with the instrument for laser pattern angle measurement. Combining even two such instruments with a beam-splitter as the element nearest the part to be tested costs working distance, which is generally in very short supply for a microscope objective, and still leaves one function missing. Separating the three instruments by attaching the part to a precision slide mechanism to be tested by all three in sequence is costly in operation time and bulk of the equipment.

Several conventional instruments are available for performing far-field pattern measurements, but these conventional instruments have several deficiencies. First, these conventional instruments typically include hardware and software that is capable of performing many functions that are not related to far-field pattern measurement, thereby making these instruments more expensive than if they were constructed solely for far-field pattern measurement. Second, conventional instruments typically require additional hardware to orient the instrument relative to a laser diode under test in a manner that makes a complete measurement possible. In particular, the conventional instruments lack a capability to measure exact position and orientation of the laser diode in X-axis, Y-axis, Z-axis, and $\theta_X$ and $\theta_Y$ orientation angles. When provided in the conventional manner described above, this additional equipment causes the total system to take up significant space. Finally, the process of assembling and operating these conventional instruments along with the needed additional equipment is fraught with complexity of alignment, and is vulnerable to operator error.

What is needed is a low cost, space-efficient, and easily assembled optical test system for determining the far-field pattern of a laser diode that overcomes the problems associated with conventional test systems, described above. In particular, what is needed is an optical test system that facilitates the detection of the emitting point location and far-field pattern pointing direction of a laser diode chip relative to a mechanical datum on the laser diode package. The angles of the laser pattern centerline and of the mechanical datum of the laser must be either constrained or measured to accuracy of about 0.1 degree at the same time.

SUMMARY

The present invention is directed to an optical test/assembly system that facilitates repeatable far-field pattern measurement of a large number of laser diodes to a high degree of accuracy by integrating the functions of a video microscope, a far-field camera, and a laser autocollimator into a single inexpensive and compact unit that obviates the need for the time-consuming and error prone mechanical adjustments required in conventional, non-integrated systems.

In accordance with an aspect of the present invention, the test system includes an optical head having a video microscope formed by an objective lens and a first relay lens that focus the light beam generated by a laser diode-under-test (LDUT) at a first image plane for digital encoding by a microscope (first) CCD-based camera. By comparing the image data generated by the microscope camera with predefined position data, the video microscope facilitates adjustment of the LDUT to precise X, Y, Z and $\theta_Z$ location for optimal accuracy and repeatability of the far-field pattern measurement process.

In accordance with another aspect of the present invention, a portion of the light beam focused by the first relay lens is reflected by a first beamsplitter and a mirror through a second relay lens, which is also provided on the optical head. The second relay lens is matched with the first relay lens such that the reflected beam portion is directed in an unfocused (collimated) state onto an infinity image plane for digital encoding by a far-field (second) CCD-based camera, thereby reducing the sensitivity of the far-field pattern measurement process to the location of the LDUT. Accordingly, the test system efficiently utilizes the objective lens and first relay lens to perform both positioning and far-field pattern measurement without having to reposition the laser diode, thereby minimizing the cost and size of the test system, and eliminating the need for mechanical adjustments required to perform these separate functions using conventional, non-integrated systems.

In accordance with yet another aspect of the present invention, a laser autocollimator is integrated into the test system by providing a second beamsplitter between the second relay lens and the far-field camera, and mounting an autocollimator laser diode on the optical head such that a light beam emitted by the autocollimator laser diode is directed backward through the second relay lens, the first relay lens, and the objective lens onto a specularly reflective datum surface of the LDUT. Light reflected from the datum surface (e.g., the face of the LDUT, which is turned off during the autocollimation process) is passed back through these lenses and focused onto the infinity image plane, where it forms a point image that is digitally encoded by the far-field camera. By comparing the position of the point image from the image data generated by the far-field camera with predefined orientation data, the autocollimator can be used to measure precise $\theta_X$ and $\theta_Y$ orientations of the LDUT with reference to an optimal orientation. This measurement can either be used to guide the adjustment of the laser to the optimal orientation position, or simply recorded and subtracted from the subsequent pointing angle measurements of the laser emission pattern to yield a measurement relative to the laser assembly datum. The latter method obviates the need for time-consuming and labor-intensive mechanical adjustment for each measurement, and the cost of the mechanical hardware it requires. Accordingly, the test system efficiently utilizes the objective lens, first and second relay lenses, and far-field camera in a single optical head having no moving parts to perform the positioning, orientation, and far-field pattern measurement without having to substantially reposition the laser diode, thereby further minimizing the cost and size of the test system, and further eliminating the need for mechanical adjustments required to perform these separate functions using conventional, non-integrated systems.

In accordance with another aspect of the present invention, a controller system (e.g., a personal computer or workstation) is provided to receive and process the image data generated by the microscope and far-field cameras. By integrating the software needed to needed to process the image data during performance of the video microscope, autocollimator, and far-field pattern measurement functions into a single controller system, the test system minimizes costs by facilitating the use of inexpensive CCD-based cameras, and eliminating the need for expensive conventional general-purpose testing systems. The controller system may also be used to control positioning of an adjustable mounting apparatus that is used to position the LDUT, and to turn on and off the LDUT and autocollimator laser diode.

In accordance with yet another aspect of the present invention, a method for measuring the far-field pattern of an LDUT includes mounting the LDUT onto an adjustable mounting apparatus that is positioned in front of the optical head (described above). Next, the LDUT is energized and a video microscope function is performed to precisely position the LDUT at the focal point of the objective lens using first image data generated by the microscope camera and processed by the controller to guide adjustments to the adjustable mounting apparatus. Next, the LDUT is turned off, and the autocollimator laser diode is energized. Autocollimation is then performed using second image data captured by the far-field camera and processed by the controller to precisely orient the LDUT such that the emitted laser beam is coincident with the primary optical axis defined by the objective lens and the first relay lens. Alternatively, the second image data captured by the far-field camera is simply recorded for subtraction from the subsequently generated far-field pattern measurements to determine a precise beam emission angle relative to the LDUT face. The autocollimator laser diode is then turned off, and the LDUT is again energized. Far-field pattern measurement is then performed using third image data generated by the far-field camera and processed by the controller. Accordingly, all three functions (i.e., microscope, autocollimator, and far-field pattern measurement) are performed using a single primary objective lens. This is comparable to a common camera zoom lens that has both telephoto and macro function in that the first element functions for both large and small source distances. However, in the common camera's case, lens elements have to move to adjust from one mode to the other. In accordance with the method utilized by the present invention, the three functions are accomplished with different optical paths "branched" with beamsplitters, so all the functions run simultaneously and with no moving parts.

BRIEF DESCRIPTION OF THE DRAWINGS

These and other features, aspects and advantages of the present invention will become better understood with regard to the following description, appended claims, and accompanying drawings, where:

DETAILED DESCRIPTION

The present invention is directed to a test system for measuring the far-field patterns generated by a series of laser diodes for purposes of rating the laser diodes (e.g., identifying laser diodes that exhibit far-field characteristics meeting minimum performance requirements for a given target system, such as an MP3 player). The laser diodes under test referenced in the examples provided below may be conventional InGaN laser diodes, which are described in additional detail above. While the examples described herein are specifically directed to measuring the far-field pattern of such laser diodes, novel aspects of the present invention may also be utilized in the performance of other testing operations, and may be included as part of an assembly process (e.g., mounting and precise alignment of laser diodes on semiconductor substrates or other packaging structures associated with target systems). Further, the novel aspects of the present invention are not specifically limited to the testing of laser diodes, and may be utilized to test other light-emitting devices.

Figure 2:
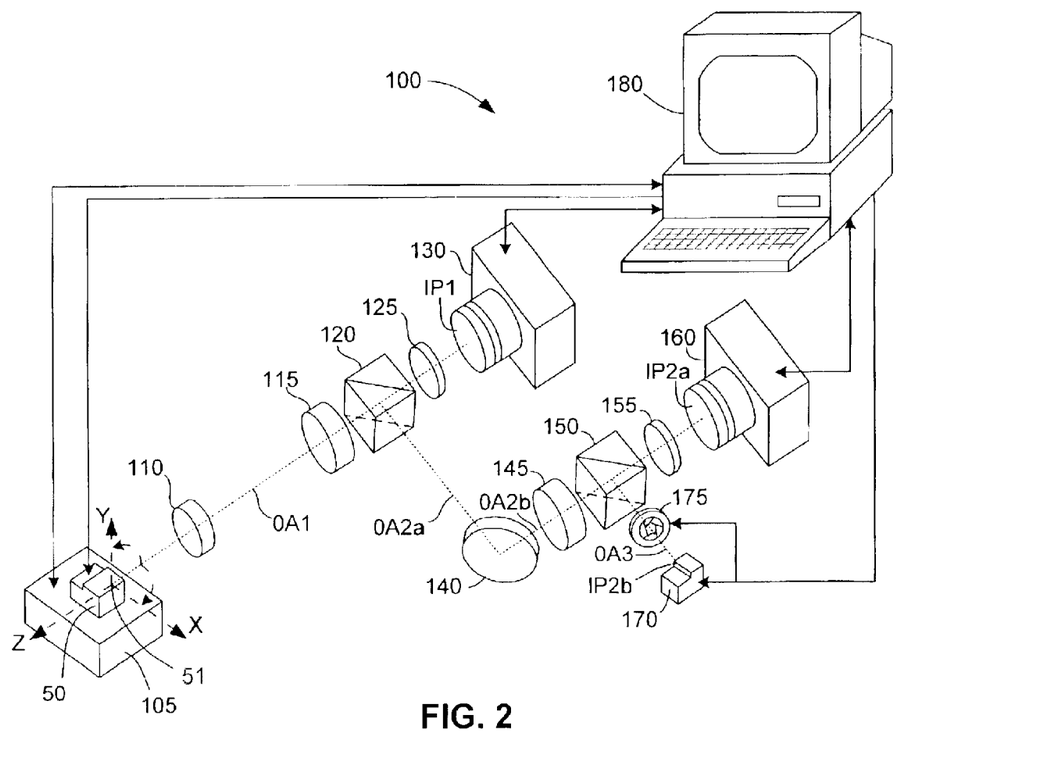
FIG. 2 is a perspective diagram showing the functional components of a test system according to an embodiment of the present invention.

FIG. 2 is a simplified perspective diagram showing the functional components of a test system 100 for measuring the far-field pattern of a laser-diode-under-test (LDUT) 50 according to an embodiment of the present invention. LDUT 50 is mounted on an adjustable mounting apparatus 105 that is positioned in front of an objective lens 110 of test system 100. As mentioned above, LDUT 50 emits laser light from an emission point 51 such that the laser light is emitted essentially perpendicular to face 52. In order to reliably characterize a group of laser diodes (i.e., measure their far-field patterns), it is necessary to precisely position and orientate each LDUT 50 such that emission point 51 is located at an origin O that coincides with the focal point of test system 100, and such that the laser beam emitted by each LDUT 50 is coincident with a primary optical axis defined by objective lens 110 of test system 100.

According to an aspect of the present invention, test system 100 facilitates the precise positioning, orientation, and testing (e.g., measuring the far-field pattern) of a group of laser diodes in which each of these operations is performed through a single objective lens, thereby avoiding the need for expensive and error-producing mechanical alignment structures that are required in conventional testing arrangements. In one embodiment, test system 100 includes objective lens 110, a first relay lens 115, a first beamsplitter 120, an optional first neutral density (ND) filter 125, a microscope (first) camera 130, an optional mirror 140, a second relay lens 145, a second beamsplitter 150, an optional second ND filter 155, a far-field (second) camera 160, an autocollimator (second) light-emitting device (laser diode) 170, an optional aperture 175, and a controller (e.g., a computer or workstation) 180. The alignment, interaction, and operation of these elements to perform the precise positioning, orientation, and testing operations are described in detail below.

As indicated in FIG. 2, objective lens 110, first relay lens 115, first beamsplitter 120, first NC filter 125, and microscope camera 130 are aligned along a first (primary) optical axis OA1. Objective lens 110 and first relay lens 115 are arranged and secured at a fixed relative spacing such that, when LDUT 50 is located at a focal point located in front of objective lens 110, light emitted from LDUT 50 is magnified and focused onto a first image plane IP1, which is coincident with an image capturing mechanism (e.g., a CCD array) of microscope camera 150. In addition, the spacing between the objective lens 110 and first relay lens 115 is set such that these two lenses also form an afocal telescope pair. This spacing allows the transmission of collimated light emitted by autocollimator laser diode 170 from the object space to the space between relay lenses 115 and 145, in each direction, which is necessary for the angle sensing function of the autocollimator (described in additional detail below). This spacing also makes the performance of the test system 100 telecentric, which means that magnification is essentially not altered by departure of the object (i.e., LDUT 50) from best focus position. First beamsplitter 120 includes a partial reflection surface that is arranged such that a portion of the focused light generated by LDUT 50 is reflected along an optical axis portion OA2a that is perpendicular to first optical axis OA1. Beamsplitter 120 is a conventional optical component that is well known in the art, and in one embodiment is of a type suitable for near-infrared light and is approximately 50%—50% reflective-versus-transmissive. Those of ordinary skill in the art will also recognize that first NC filter 125 functions to limit the beam energy passed to microscope camera 130, and may be omitted when the amount of beam energy passed through first beamsplitter 120 is at a suitable level.

Referring to a lower central portion of FIG. 2, mirror 140 is positioned and oriented such that the light received from first beamsplitter 120 along optical axis portion OA2a is reflected along an optical axis portion OA2b, which is parallel to first optical axis OA1. Note that mirror 140 facilitates the construction of test system 100 into a compact unit, and may be omitted in some embodiments, in which case optical axis portions OA2a and OA2b would be coincident (i.e., optical axis portions OA2a and OA2b would form a single (second) optical axis). However, eliminating mirror 140 may undesirably increase the size or shape of the resulting unit (e.g., require a less "sleek" optical head package).

Second relay lens 145, second beamsplitter 150, second NC filter 155, and far-field camera 160 are aligned along optical axis portion OA2b, and are constructed and arranged such that that the reflected portion of the focused light received from first relay lens 120 (via first beamsplitter 120 and mirror 140) is collimated and directed onto a second image plane IP2a, which is coincident with an image capturing mechanism (e.g., a CCD array) of far-field camera 160. In one embodiment, first and second relay lenses 115 and 145 have essentially identical optical characteristics (e.g., size and focal length), and are arranged such that the focal planes of first and second relay mirrors 115 and 145 are coincident (e.g., at a point located between first beamsplitter 120 and mirror 140). Similar to first beamsplitter 120, second beamsplitter 150 includes a partial reflection surface that is arranged to reflect light received from autocollimator laser diode 170 along optical axis portion OA2b toward mirror 140. Accordingly, second relay lens 145 and second beamsplitter 150 function during autocollimation to collimate light from autocollimator laser diode 170 for illumination of LDUT 50, and to focus light reflected from a datum surface of LDUT 50 onto second image plane IP2a. In addition, second relay lens 145 and second beamsplitter 150 function during far-field pattern measurement to form the far-field pattern (infinity plane image) of LDUT 50 at second image plane IP2a. Note that far-field camera 160 is used to generate focused (second) image data during autocollimation, and to generate far-field (third) image data during far-field pattern measurement. Similar to first NC filter 125, second NC filter 155 may be omitted when the amount of beam energy passed through second beamsplitter 150 is at a suitable level for detection by far-field camera 160.

Referring to a lower right portion of FIG. 2, autocollimator laser diode 170 (e.g., a laser diode) is fixedly mounted such that it emits a laser beam along a (third) optical axis OA3 toward second beamsplitter 150. Optional aperture 175 is mounted between autocollimator laser diode 170 and second beamsplitter 150, and functions to selectively direct light emitted from autocollimator laser diode 170 onto a limited region that includes face 52 of LDUT 50.

Referring to the upper right portion of FIG. 2, controller 180 coordinates the operation of various elements of test system 100 to perform positioning, alignment and far-field pattern measurement functions to measure the far-field pattern characteristics of LDUT 50. In particular, controller 180 is connected by control/data lines to microscope camera 130 and far-field camera 160 to facilitate their operation, and to receive image data generated by these cameras. Note that in one embodiment, controller 180 includes a frame-grabber card (e.g., an Imagenation frame-grabber available from CyberOptics Corporation of Portland, Oreg., USA) that facilitates the interpretation of the image data received from microscope camera 130 and far-field camera 160. In addition, controller 180 may include control lines (indicated by arrows) that are connected to LDUT 50 and autocollimator laser 170 and used to selectively activate (i.e., turn on and off) these light sources, and may also be used to control the operation of optional aperture 175. Finally, controller 180 can be connected by other control/data lines to adjustable mounting apparatus 105 to facilitate the precise positioning of LDUT 50 relative to objective lens 110. Note that one or more of the connections to the lasers and/or mounting apparatus 105 may be omitted when another mechanism or manual operation is used to implement the control and data transfer functions described below. Further, although controller 180 is preferably implemented by a single processing unit (e.g., computer or workstation) running associated software programs, two or more processing units may be utilized to perform the functions described herein.

Figure 3:
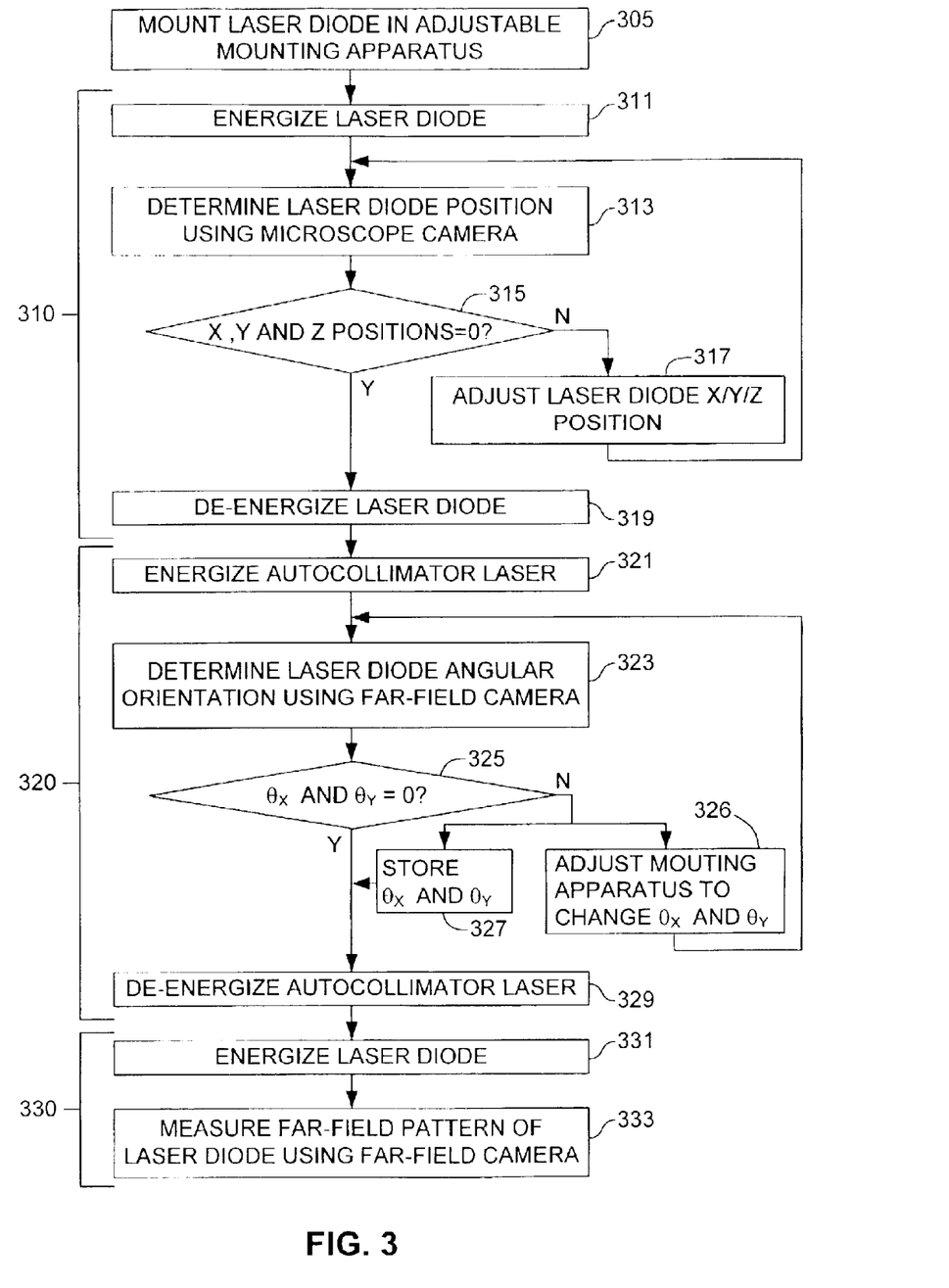
FIG. 3 is a flow diagram showing a method for testing laser diodes according to another embodiment of the present invention.

FIG. 3 is a flow diagram showing a method for measuring the far-field pattern of LDUT 50 using test system 100 (see FIG. 2) according to an embodiment of the present invention. FIGS. 4 through 10 are diagrams illustrating portions of the operation of system 100 during the performance of the video microscope, autocollimator, and far-field pattern measurement functions.

According to another aspect of the present invention, three main functions are sequentially performed during the operation of test system 100 (see FIG. 1): a video microscope function that is used to precisely position emission point 51 of LDUT 50 at origin O, an autocollimator function that is used to align LDUT 50 such that its emitted beam is aligned with first optical axis OA1 (or to record any misalignment), and a far-field pattern measurement function for measuring the far-field pattern of the beam emitted by LDUT 50. These functions are generally identified in FIG. 3 as a video microscope series 310, an autocollimator series 320, and a far-field pattern measurement series 330. As described below, the execution of these functions utilizes the various elements of test system 100 in an efficient manner to sequentially position, orientate, and measure the far-field pattern of LDUT 50, respectively.

Referring to block 305 at the top of FIG. 3, before video microscope series 310 is started, LDUT 50 is secured onto adjustable mounting apparatus 105 such that emitting point 51 of LDUT 50 is positioned in the vicinity of origin O (i.e., the focal point of objective lens 110; see FIG. 2) and roughly aligned such that a beam emitted by LDUT 50 is directed along optical axis OA1. Note that the mounting process may be manual, or performed by an automated mechanism (e.g., a robot). Note also that, when included in an assembly operation, the mounting process may involve, for example, mounting LDUT 50 onto a host substrate by way of an suitable adhesive, with the host substrate secured to adjustable mounting apparatus 105 (see FIG. 1).

After LDUT 50 is roughly positioned and oriented, the video microscope function is initiated by energizing LDUT 50 (block 311) such that LDUT 50 emits a beam that is roughly aligned with first optical axis OA1. In one embodiment, this energizing process may involve automatically transmitting a power signal from controller 180 to LDUT 50. Alternatively, the energizing process may involve manually attaching electrical connections to LDUT 50. Note also that the energizing process may be performed before or during the rough positioning process (described above).

Figures 4, 6:
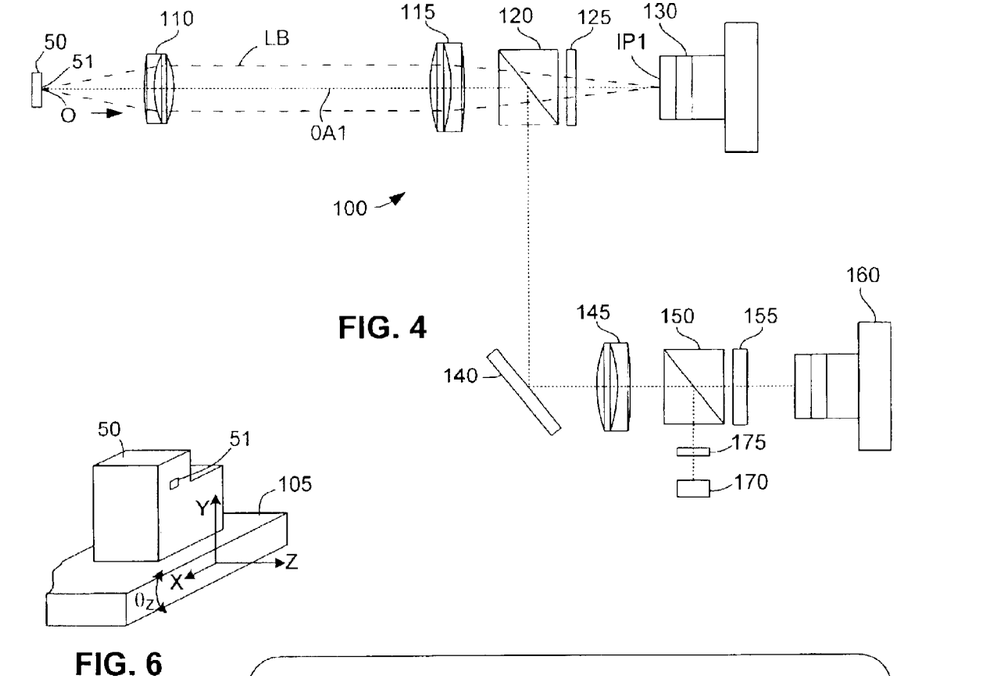
FIG. 4 is a simplified schematic diagram depicting the test system of FIG. 2 during performance of a video microscope function.
FIG. 6 is a perspective view showing a laser device under test and adjustable mounting apparatus during performance of the video microscope function.
Figure 5:
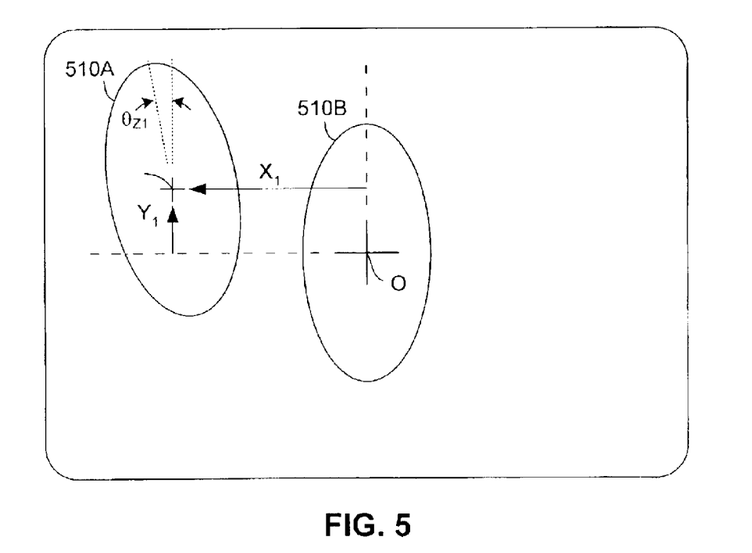
FIG. 5 is a graphical representation of image data digitally encoded by a first camera during performance of the video microscope function.

Next, as indicated in block 313 and shown in FIG. 4, the position of emission point 51 of LDUT 50 is determined using the video microscope formed by objective lens 110, first relay lens 115, and microscope camera 130. Referring to FIG. 4, with emission point 51 roughly positioned at origin O, the diverging beam emitted from LDUT 50 (which is generally indicated by region LB) is focused by objective lens 110 and first relay lens onto first image plane IP1 (via first beamsplitter 120 and first NC filter 125). Note that a portion of the emitted beam is also reflected by first beamsplitter 120, but this reflected portion is not utilized during the positioning process. FIG. 5 is a graphical representation of image data digitally encoded (captured) by camera 130 and displayed on a monitor of controller 180. Note that the image shown in FIG. 5 is enlarged for illustrative purposes, and that the actual image captured by camera 130 is a substantially smaller image relative to the display screen. As indicated in FIG. 5, to determine a current position of emission point 51 relative to origin O, image data captured by microscope camera 130 is compared with predefined position data that precisely locates origin O. In one embodiment, a location of the center of the roughly positioned oval beam pattern is calculated by controller 180 according to known techniques, and a distance between this location and origin O defines the offset of LDUT 50 in the X and Y directions from origin O. For example, as indicated in FIG. 5, roughly positioned oval beam pattern 510A is displaced an X-axis distance $X_1$ from origin O, and displaced a Y-axis distance $Y_1$ from origin O. In addition, a Z-axis deviation of LDUT 50 from origin O is determined by an unfocused state of the oval beam pattern, which is also detected by controller 180. Finally, a rotational deviation of the Z-axis deviation of LDUT 50 from origin O is determined by an unfocused state of the oval beam pattern, which is also detected by controller 180. For example, as indicated in FIG. 5, roughly positioned oval beam pattern 510A is rotated $\theta_{Z1}$ degrees from the predefined ideal orientation represented by beam pattern 510B.

Referring to block 315 in FIG. 3, the positioning process next decides whether the position of the emitted beam coincides with the predefined origin location. When controller 180 determines that LDUT 50 is not positioned at origin O (No in block 315), then control passes to block 317, where adjustments are made to the position of LDUT 50 as described below. Conversely, when controller 180 determines that LDUT 50 is positioned at origin O (Yes in block 315), then control passes to block 319.

Referring again to FIG. 5, when a magnified image of the emitted beam is offset from origin O (e.g., image 510A in FIG. 5), the location of LDUT 50 is manipulated such that the image is centered at origin O and focused to a point (e.g., as indicated by image 510B in FIG. 5). As indicated in FIG. 6, in one embodiment, this adjustment process involves manipulating adjustable mounting apparatus 105 along the X-axis, Y-axis, and Z-axis using control signals transmitted from controller 180 until the magnified image of the emitted beam is substantially centered over predefined origin O and in proper focus (e.g., within a deviation of approximately ±0.025 mm in all three dimensional axes). In addition, a rotational deviation of the Z-axis deviation of LDUT 50 from origin O may be corrected by rotating adjustable mounting apparatus 105 around the Z-axis an appropriate amount until a desired orientation is achieved, as indicated by image 510B in FIG. 5. Note that image data generated by far-field camera 160 may be utilized to perform the $\theta_Z$ adjustment.

Returning to FIG. 3, after LDUT 50 is fully positioned (i.e., Yes in decision block 315), control passes to block 319, where LDUT 50 is de-energized. This terminates the video microscope function.

Next, the autocollimation function (series 320 in FIG. 3) is performed to determine the angular orientation of LDUT 50 that utilizes a second portion of test system 100. As indicated in block 321, the autocollimation function is initiated by energizing autocollimator laser 170 using a few milliwatts of power (e.g., sufficient power to produce good detectability of the reflected image), and generating (second) image data using far-field camera 160. In one embodiment, this energizing process may involve causing controller 180 to transmit a power signal to autocollimator laser 170. Alternatively, the energizing process may involve manually attaching electrical connections to autocollimator laser 170.

Figure 7A:
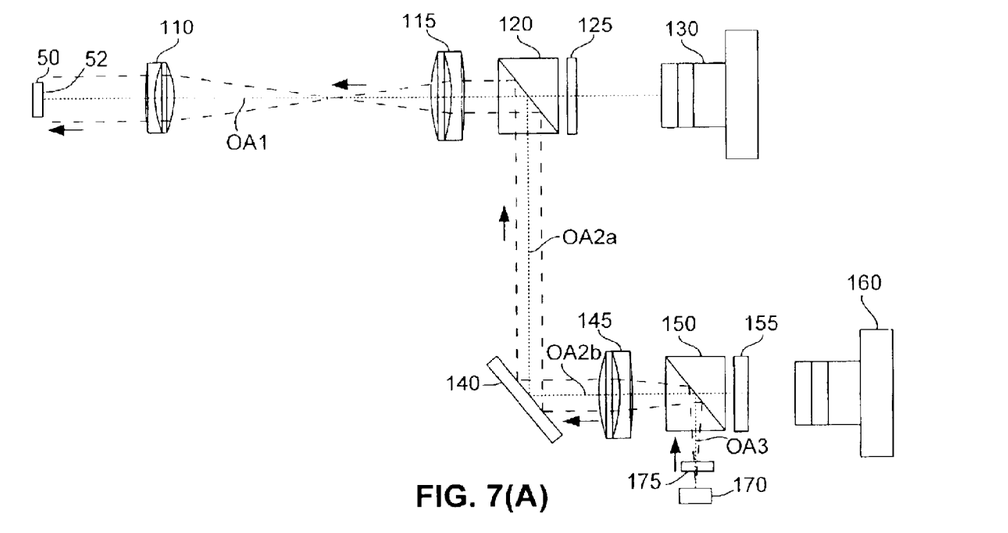
FIGS. 7(A) and 7(B) are simplified schematic diagrams depicting the test system of FIG. 2 during performance of an autocollimating function.
Figure 7B:
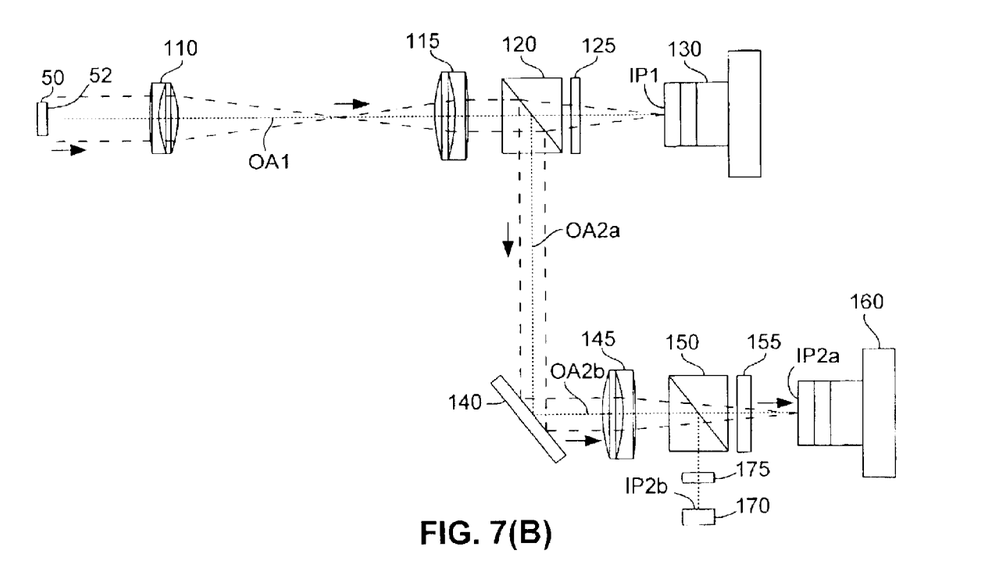

FIGS. 7(A) and 7(B) are simplified schematic diagrams illustrating the autocollimation process, where FIG. 7(A) illustrates light traveling from laser 170 to LDUT 50, and FIG. 7(B) illustrates light reflected from face (i.e., the datum surface) 52 of LDUT 50 back through test system 100 to far-field camera 160, where the image is digitized by a frame grabber of far-field camera 160. Note that the actual light beams generated by laser 170 and reflected from LDUT 50 that respectively indicated in FIGS. 7(A) and 7(B) are generated essentially simultaneously, and are separated into two figures for illustrative purposes only.

Referring to FIG. 7(A), diverging light generated by laser 170 is transmitted along third optical axis OA3 through aperture 175 to second beamsplitter 150, which reflects the light along axis O2A*b* to second relay lens 145. Second relay lens 145 collimates this light and passes the collimated light to first relay lens 115 via mirror 140 and first beamsplitter 120. As mentioned above, first relay lens 115 and objective lens 110 form an afocal telescope pair that transmits the collimated light onto face 52 of LDUT 50.

Referring to FIG. 7(B), light reflected back along first optical axis OA1 from face 52 is passed back through objective lens 110 and first relay lens 115 to first beamsplitter 120, which reflects a portion of this reflected light to image plane IP1, and reflects a second portion along optical axes OA2*a* and OA2*b* to second relay lens 145 via mirror 140. Second relay lens 145 focuses the image reflected from LDUT 50 onto image plane IP2*a* via second beamsplitter 150 and second NC filter 155. The reflected light portion received at image plane IP1 is captured by microscope camera 130, and may be utilized to selectively adjust optional aperture 175 such that the emitted autocollimator beam illuminates only a small region that includes face 52 of LDUT 50. By using aperture 175 to illuminate only a selected region, the reflected image captured by far-field camera 160 includes only that of the datum surface (e.g., face 52), and selectively omits other reflective surfaces located adjacent to the datum surface that may complicate the autocollimation process. Note that a portion of this light is also focused at image plane IP2*b*, which is coincident with the emission point of laser diode 170, although this portion of the light is not used in the autocollimation process.

Figure 8:
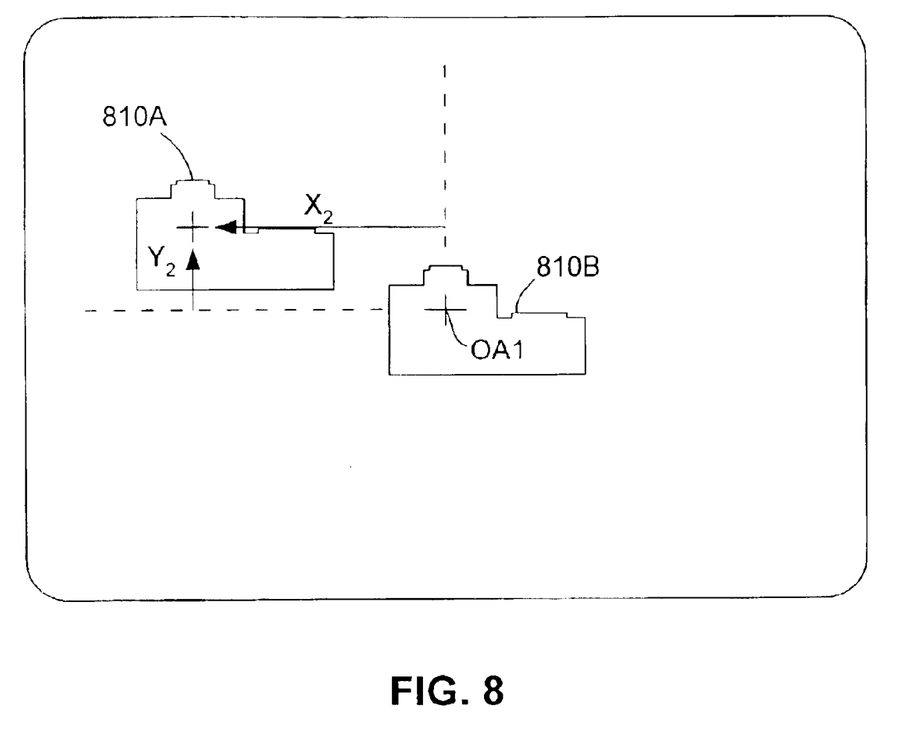
FIG. 8 is a graphical representation of image data digitally encoded by a second camera during performance of the autocollimating function.

Next, as indicated in block 323 and shown in FIG. 3, the orientation of LDUT 50 is determined using the image data generated by far-field camera 160 (i.e., indicating the image reflected from LDUT 50). FIG. 8 is a graphical representation of image data captured by camera 160 and displayed on a monitor of controller 180. As indicated in FIG. 8, to determine an angular orientation of LDUT 50 relative to first optical axis OA1, image data captured by far-field camera 160 is compared with predefined position data that precisely locates first optical axis OA1. In one embodiment, a location of the center of image data reflected from the datum surface of LDUT 50 is calculated by controller 180, and a distance between this location and optical axis OA1 defines the angular offset of LDUT 50. For example, as indicated in FIG. 8, reflected image 810A is displaced an X-axis distance $X_2$ from the ideal orientation, and displaced a Y-axis distance $Y_2$ from the ideal orientation.

Referring to block 325 in FIG. 3, the autocollimation process next decides whether the orientation of LDUT 50 coincides with the predefined optimal orientation. When controller 180 determines that LDUT 50 is not optimally oriented (No in block 325), then control passes to either to block 326 where adjustments are made to the orientation, or to block 327, where angular deviation from the optimal orientation is recorded for reference during the far-field pattern measurement process. Conversely, when controller 180 determines that LDUT 50 is positioned at origin O (Yes in block 325), then control passes to block 329.

Referring again to block 326 in FIG. 3, according to an embodiment of the present invention, the angular orientation of LDUT 50 is adjusted during autocollimation such that face 52 (i.e., the predefined datum surface) is perpendicular to first optical axis OA1. Through experimentation, the present inventors have determined that the face of a typical laser diode is substantially perpendicular to the emitted laser beam (i.e., within about 0.1°). Accordingly, by aligning the reflected image of LDUT 50 with a predefined optimal position, the laser beam emitted by LDUT 50 is reliably directed along first optical axis OA1 within a predictable margin of error, thereby facilitating highly reliable and repeatable testing of a series of laser diodes. Alternatively, other polished surfaces of a solid-state subassembly or other host structure to which LDUT 50 is mounted may be utilized as a datum surface.

Figure 9:
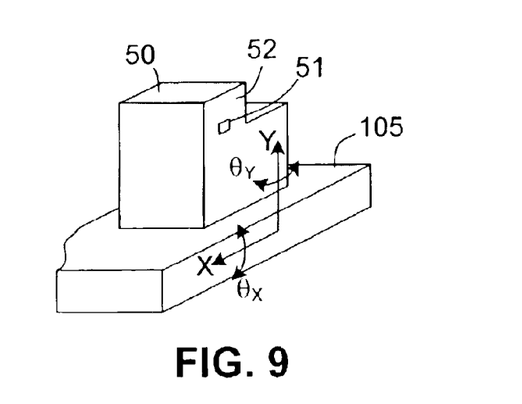
FIG. 9 is a perspective view showing a laser device under test and adjustable mounting apparatus during performance of the autocollimating function according to an embodiment of the present invention.

Referring again to FIG. 8, when the image reflected from the datum surface of LDUT 50 is offset from the optimal orientation (e.g., image 810A in FIG. 8), the angular orientation of LDUT 50 is manipulated such that the reflected image is centered at the optimal position (e.g., as indicated by image 810B in FIG. 8). Note that images 810A and 810B are enlarged for identification purposes, and are typically detected as substantially point images by far-field camera 160. As indicated in FIG. 9, in one embodiment, this angular adjustment process involves manipulating adjustable mounting apparatus 105 to pivot around the X-axis and Y-axis, thereby changing the $\theta_X$ and $\theta_Y$ tilt angles of face 52, and thus the orientation of LDUT 50. In one embodiment, this adjustment process is performed by transmitting appropriate control signals from controller 180 to adjustable mounting apparatus 105 until the reflected image of LDUT 50 is substantially centered over the predefined optimal orientation position (i.e., Yes in decision block 325; see FIG. 3).

Referring again to block 327 (FIG. 3), in an alternative embodiment, a deviation in the angular orientation of LDUT 50 that is indicated by the image data generated during the autocollimation process is not corrected, but the amount of deviation is instead stored for use during the far-field pattern measurement process. That is, by determining the amount of angular deviation from the image data generated by far-field camera 160, a correction can be made to the measured far-field pattern that accounts for the amount of deviation. This alternative embodiment simplifies the test process by eliminating the adjustment process, thereby eliminating the need for the software and/or hardware required to perform this adjustment process. Further, the difference between the angular deviation of the reflected image recorded during autocollimation and the angular deviation of the beam emitted by LDUT 50 during far-field pattern measurement may be used to calculate the precise emission angle of the emitted beam relative to face 52. For example, when the reflected autocollimation beam deviates +2° along the X-axis, and the far-field pattern devices 1.25° along the X-axis, then the laser beam emitted by LDUT 50 deviates −0.25° from the perpendicular to face 52. A similar process may be used to determine Y-axis deviation. Note that the measured deviation from the autocollimator beam is divided by two because the autocollimator beam travels twice through the optical system, whereas the far-field pattern is generated by LDUT 50 passes through the optical system only once. The calculated precise emission angle may be recorded, and then utilized during assembly of LDUT 50 onto a host substrate to precisely align the emitted beam using face 52 as a reference, thereby making the assembly process less complex and less expensive.

Referring again to FIG. 3, after LDUT 50 is fully oriented and/or the angular orientation data is stored, autocollimator laser 170 is de-energized (block 329), and the autocollimation process is terminated.

Figure 10:
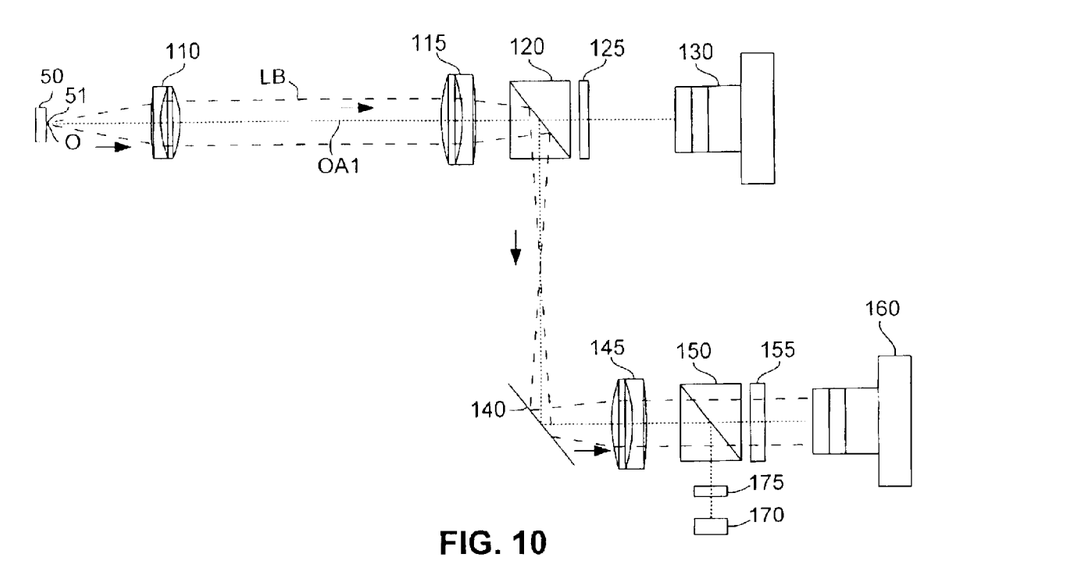
FIG. 10 is a simplified schematic diagram depicting the test system of FIG. 2 during performance of a far-field pattern measurement function.

Once LDUT 50 is fully positioned and oriented (or deviations are recorded), far-field pattern measurement is performed using far-field camera 160. In particular, as indicated in block 331, LDUT 50 is again energized in the manner described above, and the laser beam emitted therefrom is transmitted through test system 100 in the manner illustrated in FIG. 10. Referring to FIG. 10, with emission point 51 precisely positioned at origin O, the diverging beam emitted from LDUT 50 (which is generally indicated by region LB) is focused by objective lens 110 and first relay lens onto first image plane IP1, and a portion of the partially focused beam is reflected by first beamsplitter 120 to second relay lens 145 via mirror 140. As discussed above, second relay lens 145 is matched with first relay lens 115 such that the reflected portion of the beam is collimated and transmitted as an unfocused image onto second (infinity) image plane IP2a (via second beamsplitter 145 and second NC filter 155). With the beam collimated in this manner, measurement of the far-field pattern is performed using conventional methods (block 333).

Note that when the angular orientation is not adjusted (i.e., when the deviation is recorded; see discussion directed to block 327, above), then the far-field pattern measurement is adjusted to account for this deviation.

Figure 11:
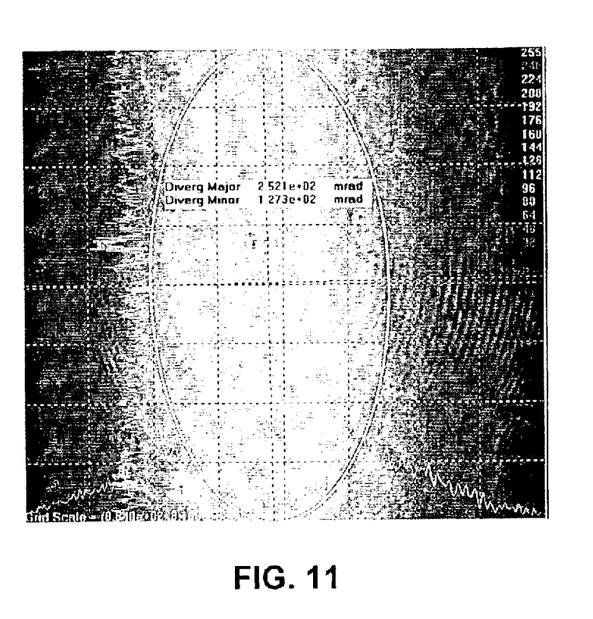
FIG. 11 is a photograph showing a graphical representation depicting image data generated during performance of the far-field pattern measurement.

FIG. 11 is a photograph illustrating an example of a far-field pattern measurement taken in accordance with an embodiment of the present invention. The pattern shown in FIG. 11 is generated by a Spiricon™ beam analyzer system (e.g., model no. LBA-300PC) produced by Spiricon, Inc. of Logan Utah, USA, and illustrates the intensity versus angular position of the exemplary far-field pattern. The analysis software of the Spiricon system calculates and displays Gaussian beam parameters as well. The intensity profile of the far-field pattern is analyzed as desired for laser beam characterization and evaluation to classic laser beam measurement parameters by software algorithms performing two-dimensional curve-fitting and numerical integration according to known techniques. Beam parameters calculated may include Gaussian beam profile widths, centroid position, ellipticity and orientation of the ellipse long axis.

Note that although a Spiricon™ beam analyzer system may be utilized to perform far-field pattern measurement, the test system of the present invention facilitates the use of less complex CCD cameras and associated software, thereby minimizing the cost of the test system.

Figure 12:
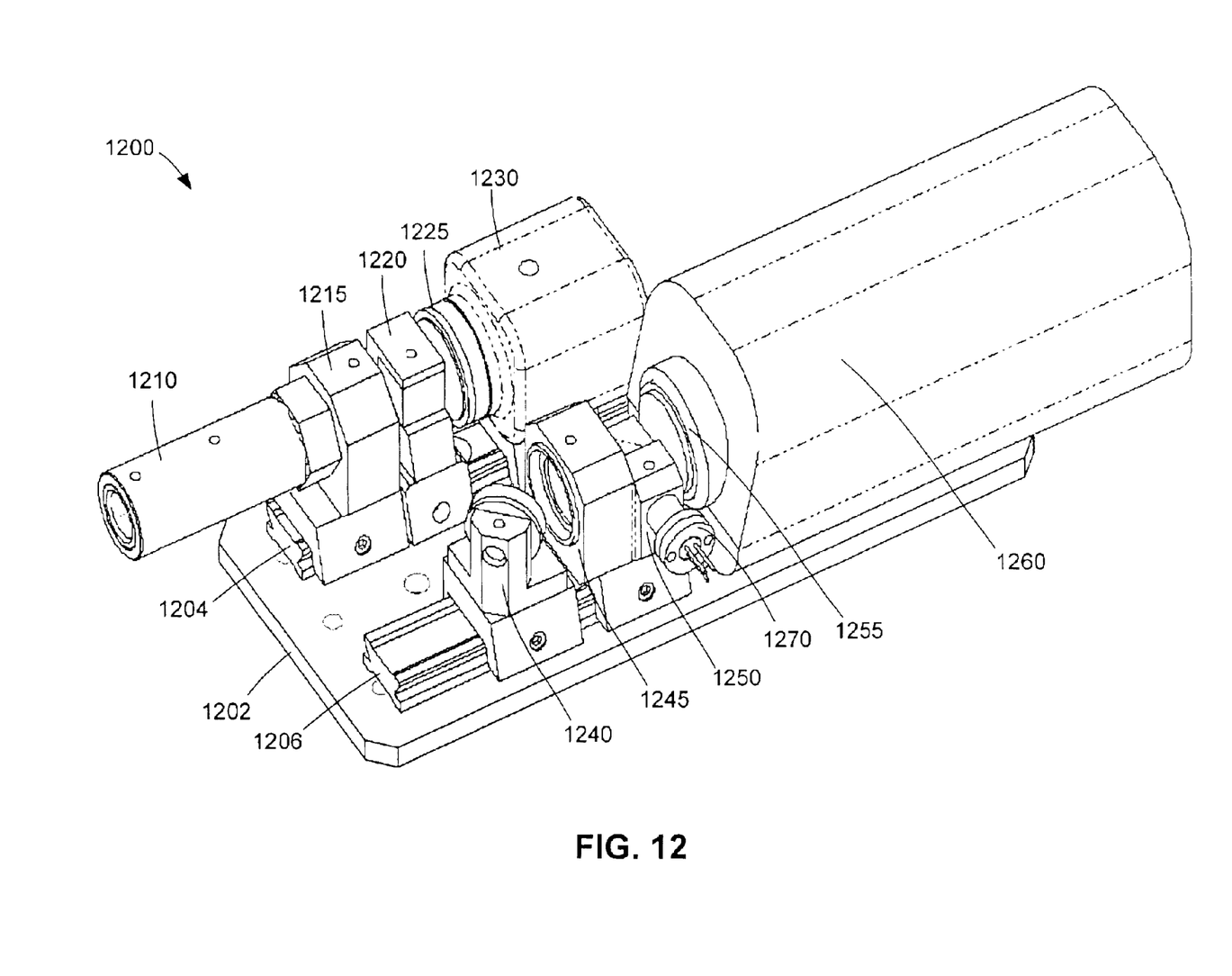
FIG. 12 is a perspective view showing an exemplary testing apparatus according to a specific embodiment of the present invention.

FIG. 12 is a perspective view depicting a prototype optical head 1200 that was built by the present inventors in accordance with another embodiment of the present invention. Optical head 1200 is about the size of a shoebox, and includes a base 1202 upon which a pair of parallel mounting rails 1204 and 1206 is fixedly mounted. An objective lens structure 1210 is mounted on a first relay lens structure 1215, which in turn is secured to first mounting rail 1204. A first beamsplitter structure 1220 is similarly secured next to first relay lens structure 1215, and a first NC filter 1225 and first digital camera 1230 (e.g., a Watec LCL-211H CCD) are sequentially mounted next to first beamsplitter structure 1220. Similarly, a mirror structure 1240, a second relay lens structure 1245, a second beamsplitter structure 1250, a second NC filter, and a second camera 1260 are mounted on second mounting rail 1206. An autocollimator laser diode is secured to second beamsplitter 1250.

Figure 13:
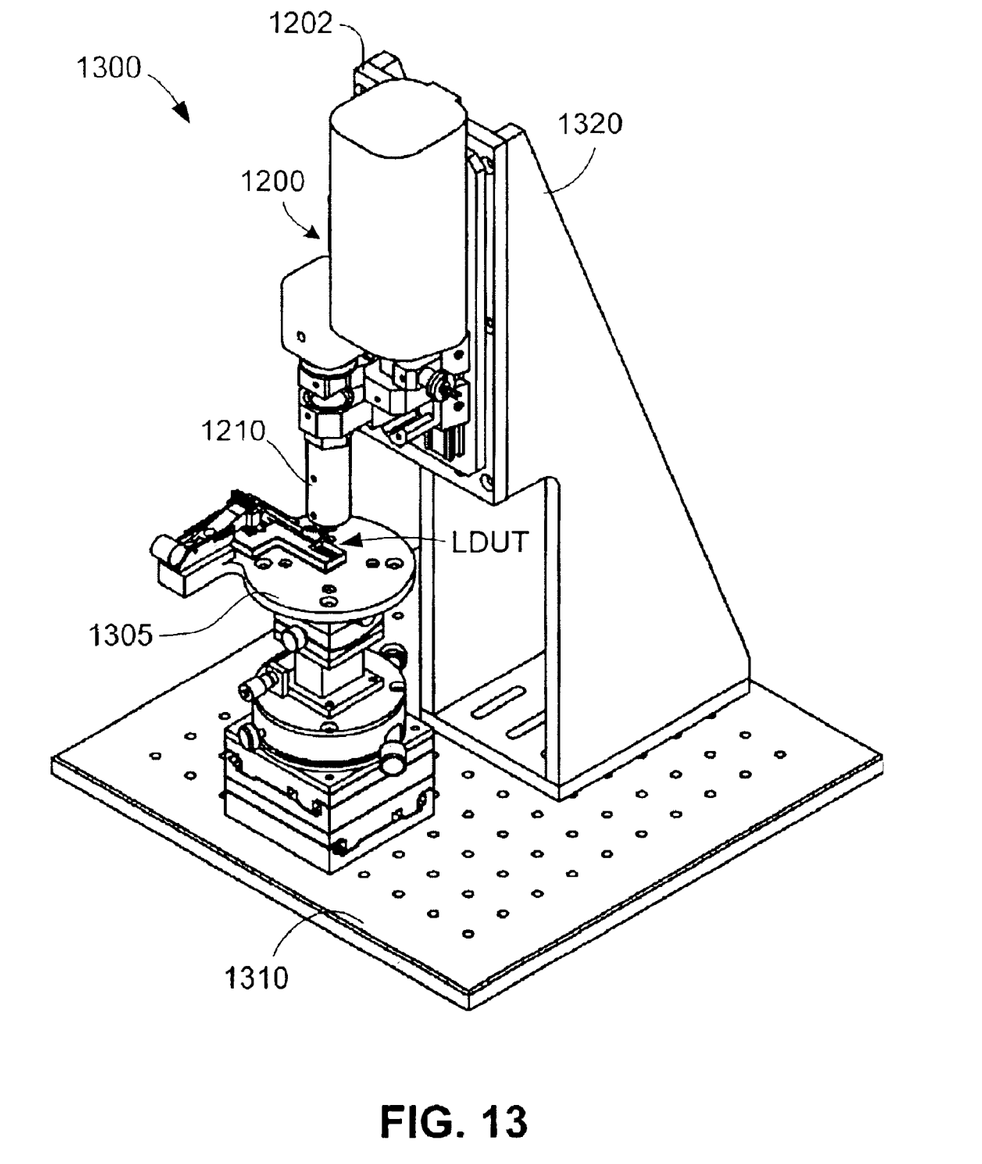
FIG. 13 is a perspective view showing an exemplary testing system according to a specific embodiment of the present invention.

FIG. 13 is a perspective view depicting a prototype testing system 1300 (the controller is not shown) that utilizes optical head 1200 to measure the far-field pattern of a laser diode under test (LDUT). Testing apparatus 1300 includes an adjustable mounting apparatus 1305 (e.g., a for securing the LDUT below optical head 1200. Adjustable mounting apparatus 1305 is fixedly mounted on a base plate 1310, and base 1202 of optical head 12000 is secured to a frame 1320 that is also fixedly mounted on base plate 1310. Testing system 1300 operates essentially as described above.

Although the present invention has been described with respect to certain specific embodiments and alternative arrangements, it will be clear to those skilled in the art that the inventive features of the present invention are applicable to other embodiments as well, all of which are intended to fall within the scope of the present invention. For example, although the test system of the present invention is described herein as being used to determine (test) the far-field pattern of conventional InGaN laser diodes, the novel aspects of the test system may be utilized to test other types of laser diodes, or other non-collimated light sources. Moreover, novel aspects of the test system described herein are not limited to the specific embodiments that facilitate the video microscope, autocollimation, and far-field pattern measurement functions. For example, a useful test system may be formed that facilitates only the video microscope and far-field pattern measurement functions (e.g., by omitting the second beamsplitter and the autocollimator laser diode). Similarly, a useful test system may be formed that facilitates only the autocollimator and far-field pattern measurement functions, or that facilitates only the video microscope and autocollimator functions (e.g., to align a light source for a test other than far-field pattern measurement).

What is claimed is:

1. A test system for measuring a far-field pattern generated by a first light-emitting device, the test system comprising:

an objective lens and a first relay lens aligned along a first optical axis and arranged to focus light emitted from the first light-emitting device onto a first image plane;

a first beamsplitter located along a first optical axis between the first relay lens and the first image plane and arranged such that a portion of the focused light is reflected along a second optical axis;

a second relay lens positioned in the second optical axis, the second relay lens being formed and positioned such that the reflected portion of the focused light is collimated and directed onto a second image plane, first means for calculating a position of the first light-emitting device relative to the objective lens based from the focused light emitted by the first light-emitting device, and second means for measuring the far-field pattern from the collimated light emitted by the first light-emitting device.

2. The test system according to claim 1, wherein the first means comprises:

a first camera located at the first image plane for generating first image data from the focused light emitted by the first light-emitting device; and means for comparing the first image data with predetermined position data to calculate the position of the first light-emitting device relative to the objective lens.

3. The test system according to claim 1, further comprising:

an adjustable mounting apparatus for supporting the first light-emitting device; and means for manipulating the adjustable mounting apparatus such that an emitting point of the first light-emitting device is located at a predefined position relative to the objective lens.

4. The test system according to claim 1, further comprising:

a second beamsplitter located along the second optical axis between the second relay lens and the second image plane; and a second light-emitting device fixedly positioned adjacent to the second beamsplitter and arranged such that second light emitted from the second light-emitting device is reflected by the second beamsplitter along the second optical axis toward the second relay lens.

5. The test system according to claim 4, further comprising:

a second camera located at the second image plane for generating second image data from portions of the second light reflected from a datum surface of the first light-emitting device; and means for comparing the second image data with predetermined orientation data to calculate an angular orientation of the first light-emitting device relative to the objective lens.

6. The test system according to claim 5, further comprising:

an adjustable mounting apparatus for supporting the first light-emitting device; and means for manipulating the adjustable mounting apparatus such that the datum surface of the first light-emitting device is in a predetermined orientation relative to the first optical axis.

7. The test system according to claim 1, wherein the second means comprises:

a second camera located at the second image plane for generating third image data from the collimated light emitted by the first light-emitting device; and means for processing the third image data to measure the far-field pattern of the first light emitted from the first light-emitting device.

8. The system according to claim 1, further comprising a mirror located in the second optical axis between the first beamsplitter and the second relay lens such that the mirror reflects the reflected focused light received from a first portion of the second optical axis to a second portion of the second optical axis, wherein the second portion of the second optical axis is parallel to the first optical axis.

9. A test system for measuring a far-field pattern generated by a first light-emitting device, the test system comprising:

an objective lens, a first relay lens, and a second relay lens arranged to transmit light emitted from the first light-emitting device onto a second image plane in an unfocused state;

a second beamsplitter located between the second relay lens and the second image plane;

a second light-emitting device fixedly positioned adjacent to the second beamsplitter and arranged such that second light emitted from the second light-emitting device is reflected by the second beamsplitter toward the second relay lens;

a second camera located at the second image plane for generating second image data from portions of the second light reflected from a datum surface of the first light-emitting device during an autocollimation process, and for generating third image data from collimated light emitted by the first light-emitting device during a far-field pattern measurement process;

means for comparing the second image data with predetermined orientation data during the autocollimation process to calculate an angular orientation of the first light-emitting device relative to the objective lens; and means for processing the third image data to measure the far-field pattern of the first light emitted from the first light-emitting device during the far-field pattern measurement process.

10. The test system according to claim 9, further comprising an aperture located between the second light-emitting device and the second beamsplitter.

11. The test system according to claim 9, further comprising:

an aperture located between the second light-emitting device and the second beamsplitter; and means for controlling the aperture such that the second light emitted by the second light-emitting source is directed onto a predefined datum surface.

12. The test system according to claim 11, further comprising a first beamsplitter located along a first optical axis between the first relay lens and the first image plane and arranged such that a portion of the focused light is reflected along a second optical axis to the second relay lens, wherein said means comprises a first camera located at the first image plane for generating first image data from light received from the first light-emitting device.

13. A method for testing a light-emitting device using a test apparatus including an objective lens, a first relay lens, and a second relay lens, the objective lens and the first relay lens defining a primary optical axis and being arranged to transmit first light emitted from the light-emitting device onto a first image plane in a focused state, and the second relay lens being arranged with the objective lens and the first relay lens to transmit second light emitted from the light-emitting device onto a second image plane in a unfocused state, the method comprising:

positioning the light-emitting device relative to the primary optical axis using first image data generated from the first light, and measuring the far-field pattern using third image data generated from the second light.

14. The method according to claim 13, wherein positioning comprises:

digitally encoding the first light to generate the first image data; and comparing the first image data with predetermined position data to calculate a position of the light-emitting device relative to the objective lens.

15. The method according to claim 14, further comprising manipulating the position of the light-emitting device such that an emitting point of the light-emitting device is located at a predefined position relative to the objective lens.

16. The method according to claim 13, wherein measuring the far-field pattern comprises digitally encoding the second light using a camera to generate the third image data.

17. The method according to claim 13, further comprising determining an orientation of the light-emitting device relative to the primary optical axis using second image data generated by the camera.

18. The method according to claim 13, further comprising:

transmitting an autocollimating light beam through the second relay lens, the first relay lens, and the objective lens against a datum surface of the light-emitting device;

generating second image data by digitally encoding light reflected from the light-emitting device and focused by the objective lens, the first relay lens, and the second relay lens on the second image plane; and comparing the second image data with predetermined orientation data to calculate an orientation of the light-emitting device relative to the primary optical axis.

19. A method for testing a laser diode using a test apparatus including an objective lens, a first relay lens, and a second relay lens, the objective lens and the first relay lens defining a primary optical axis, the second relay lens being arranged with the objective lens and the first relay lens to transmit light emitted from the laser diode onto an infinity image plane, the method comprising:

transmitting an autocollimating light beam through the second relay lens, the first relay lens, and the objective lens against a face of the laser diode;

generating second image data by digitally encoding focused light reflected from the face of the laser diode and focused by the objective lens, the first relay lens, and the second relay lens on the second image plane;

comparing the second image data with predetermined orientation data to calculate first orientation data describing an first orientation of the laser diode relative to the primary optical axis;

terminating the autocollimating light beam and energizing the laser diode such that the laser diode transmits a laser beam into the objective lens;

generating third image data by digitally encoding light from the laser beam and transmitted by the objective lens, the first relay lens, and the second relay lens to the infinity plane; and comparing the third image data with the predetermined orientation data to calculate second orientation data describing a second orientation of the laser beam relative to the primary optical axis.

20. The method according to claim 19, further comprising calculating an emission angle of the laser beam relative to the face of the laser diode by calculating a difference between the first and second orientation data.

* * * * *

UNITED STATES PATENT AND TRADEMARK OFFICE
CERTIFICATE OF CORRECTION

PATENT NO. : 6,922,232 B2
DATED : July 26, 2005
INVENTOR(S) : Stephen W. Farnsworth It is certified that error appears in the above-identified patent and that said Letters Patent is hereby corrected as shown below:

Drawings,
FIG. 3, block 326, "MOUTING" should be replaced with -- MOUNTING -- (as shown on the attached page).

Column 1,
Line 26, replace "9-doped" with -- n-doped --.

Column 5,
Line 19, delete "needed to" (second occurrence).

Column 13,
Line 54, delete "is".

Column 15,
Line 3, delete "a".
Line 4, insert a parenthesis after "1200".

Column 17,
Line 43, replace "a" (second occurrence) with -- an --.

Column 18,
Line 42, replace "an" with -- a --.

Signed and Sealed this

Thirteenth Day of September, 2005

JON W. DUDAS
*Director of the United States Patent and Trademark Office*

FIG. 3